Sept. 13, 1927.

C. L. LAWTON 1,642,160

HEADLIGHT

Filed March 27, 1926

INVENTOR.
Charles L. Lawton
BY
Francis D. Hardesty.
ATTORNEY.

Patented Sept. 13, 1927.

1,642,160

UNITED STATES PATENT OFFICE.

CHARLES L. LAWTON, OF HANCOCK, MICHIGAN.

HEADLIGHT.

Application filed March 27, 1926. Serial No. 97,857.

The present invention relates to headlights, and more specifically to headlights for locomotives for use in mines where a light on the locomotive is useful more to indicate its position to an observer than to afford illumination.

Some of the outstanding objects of this invention are:—

A headlight which shall afford sufficient illumination, the lamp colored to suit the needs of the user, thereby acting as a safety device especially in mines where such a light, when properly mounted, can be seen over the top of a train at either end at a considerable distance away.

To so mount the bulb therein as to render it substantially immune from shocks caused either by vibration and jars of the locomotive or by falling fragments of rock or ore.

With these objects in view, the invention consists broadly in a headlight casing of great resistance to fracture or crushing, carrying therein a light in a socket mounted on a shock absorbing holder, the whole being bolted or otherwise rigidly secured to the locomotive.

Reference should be made to the accompanying drawing in which.

Figure 1:
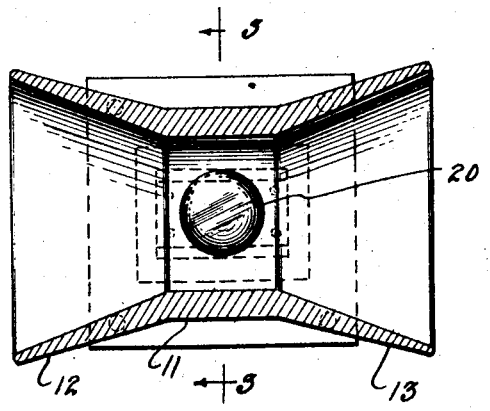
Fig. 1 is a horizontal section through the device looking downwardly.
Figure 3:
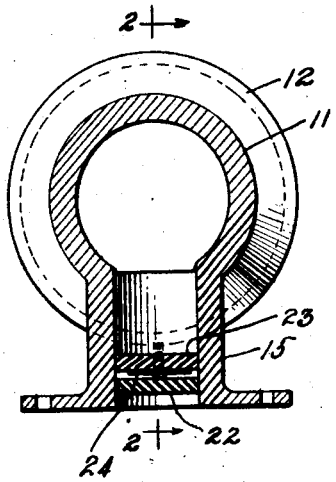
Fig. 3 is a section on line 3—3 of Fig. 1.
Figure 2:
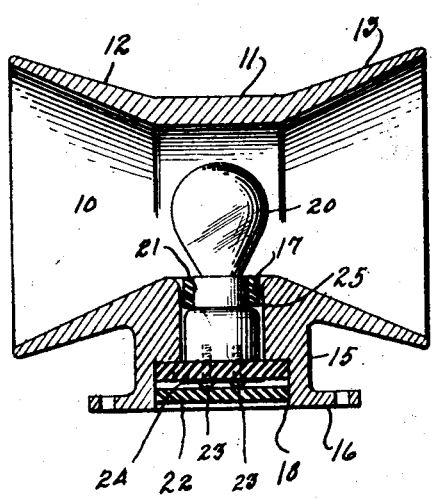
Fig. 2 is a section on line 2—2 of Fig. 3.

In the drawings the device is shown as consisting of a casing or cover 10 having a central cylindrical portion 11 with flared extensions 12 and 13. At its central portion, the cover 10 is provided with a post or stem portion 15 which is provided with a flange 16 furnishing means by which the headlight may be secured to the locomotive.

The post or stem 15 is hollow, being cyllindrical in its upper part as at 17 and opens into cover 10 at about midway the length thereof. The opening is enlarged as at 18 in its lower portion.

The light bulb is shown at 20 as seated in a socket 21 secured by means of bolts 23 to a block 22 which is preferably made of two thicknesses of flexible material such as rubber. The socket 21 is bolted to the upper one-half of the flexible material by means of the two bolts 23 and the thin round metal disc 24 which acts as a washer. The whole block 22 is made slightly larger than the opening and upon assembly is allowed to expand in place, thereby holding the mounting tightly.

Socket 21 is surrounded with a ring or gasket 25 of flexible material such as rubber to help take up the horizontal vibration or shock.

Electricity is furnished to the lamp by means of a cord which passes through the flexible block 22 and disc 24 and into socket 21.

The casing or cover 10 with its stem 15 and base 16 is preferably made of cast iron or some other suitable metal and with a comparatively thick section in order to withstand blows occasioned by rough usage and falling ore or rock fragments.

The mounting of the bulb in the manner described shields it from shocks both vertical and horizontal, the elastic mounting absorbing such shocks.

Having now described the invention and the preferred form of embodiment thereof, it is to be understood that said invention is not limited to the precise details shown and described but only by the scope of the claims which follow.

I claim:—

1. A mine locomotive headlight consisting of a relatively thick section shock resisting casing open at both ends and having a light bulb therein, means to mount said casing upon a locomotive and shock absorbing means between said casing and light bulb.

2. A headlight consisting of a stem or post portion having a cover integral with and extending across said post the whole being of relatively thick section material and capable of withstanding heavy blows and shocks, said post having an opening therein opening into the casing, an electric bulb socket mounted in said opening in said post, means in said mounting to absorb vertical shocks and means to absorb lateral shocks.

3. A headlight consisting of a relatively thick section cast metal casing having an opening in its lower side for an electrc light socket, a light socket therein and spaced from the sides thereof surrounded by a soft rubber ring or gasket, a rubber block in the lower end of said opening and to which said socket is secured, and means to mount said casing on a support.

CHARLES L. LAWTON.